United States Patent
Sapena Soler

(10) Patent No.: US 9,973,463 B2
(45) Date of Patent: May 15, 2018

(54) METHOD FOR THE CERTIFICATION OF DATA MESSAGES TRANSMISSION TO MOBILE TERMINALS

(75) Inventor: Francisco Sapena Soler, Lleida (ES)

(73) Assignee: LLEIDANETWORKS SERVEIS TELEMATICS S.A., Lleida (ES)

( * ) Notice: Subject to any disclaimer, the term of this patent is extended or adjusted under 35 U.S.C. 154(b) by 0 days. days.

(21) Appl. No.: 13/437,717

(22) Filed: Apr. 2, 2012

(65) Prior Publication Data

US 2013/0218990 A1   Aug. 22, 2013

(30) Foreign Application Priority Data

Feb. 21, 2012 (EP) .................................... 12382061

(51) Int. Cl.
| | | |
|---|---|---|
| *G06F 15/16* | (2006.01) | |
| *H04L 12/58* | (2006.01) | |
| *G06Q 10/10* | (2012.01) | |

(52) U.S. Cl.
CPC .......... *H04L 51/30* (2013.01); *G06Q 10/107* (2013.01)

(58) Field of Classification Search
CPC ..... H04L 63/0823; H04L 51/30; G06F 21/23; H04W 4/12; H04W 4/14
USPC ....................................................... 709/206
See application file for complete search history.

(56) References Cited

U.S. PATENT DOCUMENTS

| | | | | |
|---|---|---|---|---|
| 6,871,278 B1* | 3/2005 | Sciupac | ............... | G06Q 20/382 |
| | | | | 705/64 |
| 7,822,820 B2* | 10/2010 | LeVasseur et al. | ........... | 709/206 |
| 8,205,084 B2* | 6/2012 | Godfrey | ............... | G06Q 10/107 |
| | | | | 380/270 |
| 8,694,032 B1* | 4/2014 | Kilpatrick | ............... | H04W 4/12 |
| | | | | 370/312 |

(Continued)

FOREIGN PATENT DOCUMENTS

| | | |
|---|---|---|
| CN | 1653458 A | 8/2005 |
| JP | 2004080134 A | 3/2004 |
| JP | 2009135962 A | 6/2009 |

OTHER PUBLICATIONS

Digital cellular telecommunications system (Phase 2+); Universal Mobile Telecommunications System (UMTS); Telecommunication management; Charging management; Charging principles (3GPP TS 32.200 version 5.1.0 Release 5); ETSI TS 132 200, IEEE, Lis, Sophia Antipolis Cedex, France, 2002, 3:SA5:V5.1.0:81-82.

(Continued)

*Primary Examiner* — Kevin Bates
*Assistant Examiner* — Clarence McCray
(74) *Attorney, Agent, or Firm* — Hayes Soloway PC

(57) ABSTRACT

The invention consists of a method so that a telecommunications operator can deliver data messaging, digitally sign it and deliver it to the user with a certificate. The method is based on the:
  creation of a data message through a user interface, which is
  delivered to the destination; upon (Continued)

reception of a delivery notification of the data message sent to the destination, the data processing unit creates an electronic document that comprises at least issuing user data, date of issuance, content and delivery notification data of the message sent, said electronic document is encrypted by the implementation of a digital signature algorithm for the creation of a certificate, which is delivery of the certificate to the user through the mail server.

4 Claims, 1 Drawing Sheet

(56) References Cited

U.S. PATENT DOCUMENTS

| | | | | |
|---|---|---|---|---|
| 2003/0147536 | A1* | 8/2003 | Andivahis | H04L 63/06 380/277 |
| 2004/0177048 | A1* | 9/2004 | Klug | G06Q 10/107 705/401 |
| 2005/0121861 | A1* | 6/2005 | Harris | B23B 31/123 279/62 |
| 2005/0251861 | A1* | 11/2005 | Cunningham | H04L 63/0428 726/23 |
| 2006/0268907 | A1* | 11/2006 | Lee | H04L 12/5692 370/401 |
| 2007/0005716 | A1* | 1/2007 | LeVasseur et al. | 709/206 |
| 2007/0113101 | A1* | 5/2007 | LeVasseur et al. | 713/189 |
| 2007/0136203 | A1* | 6/2007 | Guahk | H04H 60/23 705/51 |
| 2007/0174402 | A1 | 7/2007 | Tomkow | |
| 2007/0192590 | A1* | 8/2007 | Pomerantz | H04L 63/0823 713/157 |
| 2008/0278740 | A1* | 11/2008 | Bird | G06Q 10/10 358/1.15 |
| 2009/0144382 | A1* | 6/2009 | Benninghoff, III | H04L 9/3236 709/206 |
| 2009/0144541 | A1* | 6/2009 | Kim | H04L 63/0869 713/156 |
| 2010/0217979 | A1 | 8/2010 | Yaghmour | |
| 2010/0223470 | A1* | 9/2010 | Lord | H04L 63/0823 713/175 |
| 2010/0250691 | A1* | 9/2010 | Tomkow | H04L 12/5875 709/206 |
| 2011/0078081 | A1 | 3/2011 | Pirzadeh et al. | |
| 2011/0113109 | A1* | 5/2011 | LeVasseur et al. | 709/206 |
| 2011/0287748 | A1* | 11/2011 | Angel | H04M 3/42221 455/414.1 |
| 2012/0233470 | A1* | 9/2012 | Everett | G06Q 30/06 713/176 |
| 2013/0007459 | A1* | 1/2013 | Godfrey | G06Q 10/107 713/175 |
| 2013/0086182 | A1* | 4/2013 | Bazot | H04L 51/18 709/206 |

OTHER PUBLICATIONS

Integrated Services Digital Network (ISDN); Short Message Service (SMS) supplementary service; Digital Subscriber Signalling System No. one (DSS1) protocol; Part 1: Protocol Specification, ETSI Draft; TD04R1 SPAN 130286 01-DSS1 Ians Version, European Telecommunications Standards Institute (ETSI), 650, Route Des Lucioles ; F-06921 Sophia-Antipolis; France, 2002, 0.1:1-33.
European Search Report issued in EP12382061 dated Jun. 6, 2012.

* cited by examiner

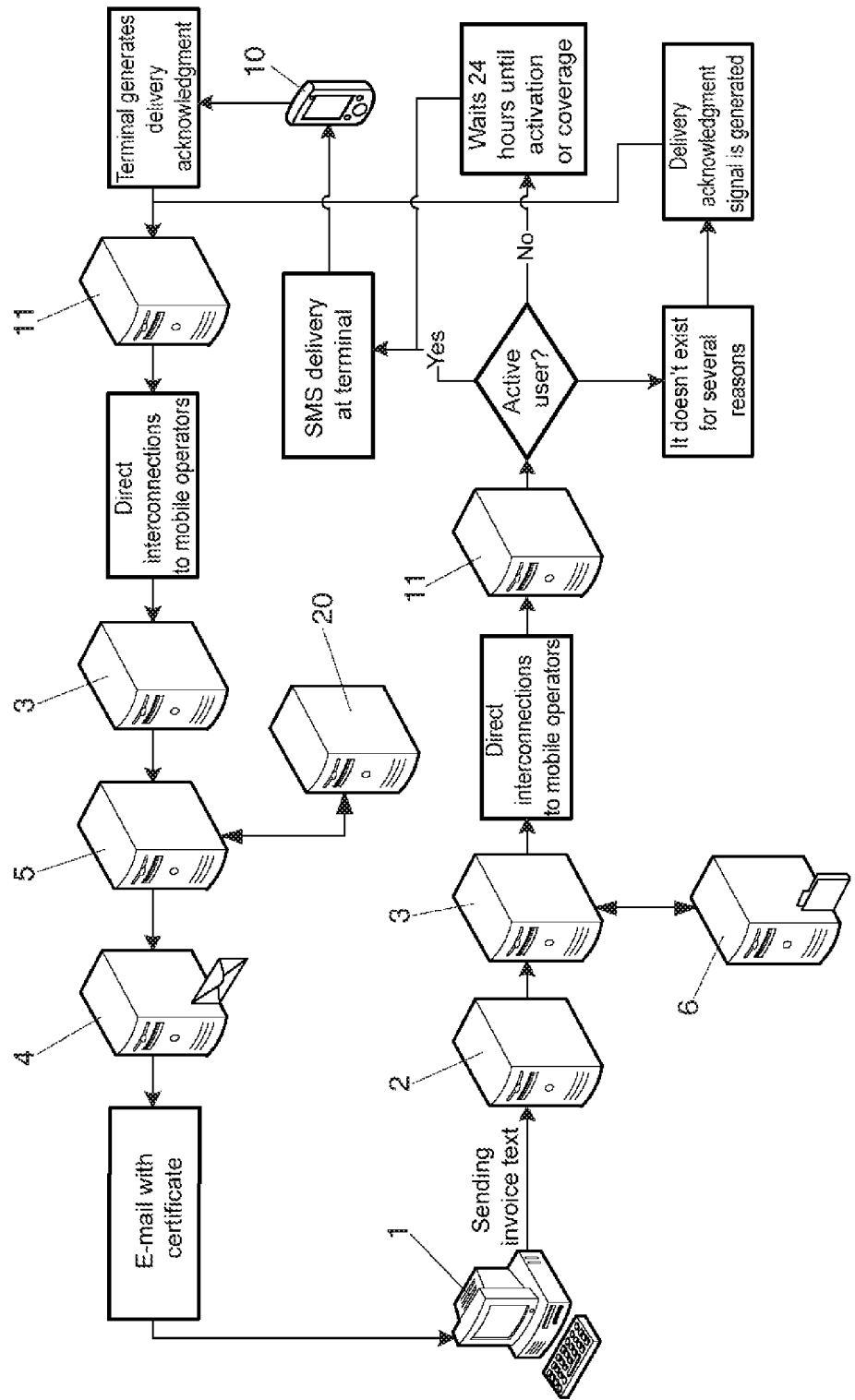

METHOD FOR THE CERTIFICATION OF DATA MESSAGES TRANSMISSION TO MOBILE TERMINALS

This application claims the benefit of European Patent Application No. 12382061, filed Feb. 21, 2012, which is hereby incorporated by reference.

OBJECT OF THE INVENTION

The object of the invention is a method so that a telecommunications operator can deliver data messaging, both short and multimedia messages, to finally digitally sign them and deliver them to the generating user with a certificate as the operator and trusted third party which provides guarantee that the data message and its content have been delivered to the receiver.

BACKGROUND OF THE INVENTION

It is well known that, currently, electronic communications have become an essential and indispensable tool for any operation, both legal and illegal. Communications are used for all types of movements, generation of calls, messages, etc., from a source to a destination.

Telecommunications operators are those that provide the infrastructure to manage, direct and store a large part of this traffic. These telecommunications operators are subjected to regulation, among others, for the use of the radio spectrum which is limited, or for the use of telephone numbering resources that are also finite.

Telecommunications operators, in addition, keep records of the transactions performed by users with the objective, among others, of pricing, registration of the numbers associated with them, billing references, as well as the record of any transactional data used in billing the user. These records are preserved for further verification of pricing and/or follow-up of the traffic on the part of the user.

Occasionally, judicial authorities are requesting the telecommunications operators recorded data of electronic transactions that were carried out, as they consider them trusted third parties for the purpose of providing these data, as well as any data that can help to determine the physical or legal persons who have carried out the act in question.

However, the search for the requested data to the telecommunications operator is usually complicated by the fact that it is performed on records of activities with great volume, usually designed for billing more than for the follow-up of the traceability of the data. Therefore, the above mentioned search of the requested data can consume an enormous amount of resources for the telecommunications operator.

Once the data requested by the judicial authorities is located, the operator issues a certificate where it explicitly states the transactional data requested, the frequency, the destinations, as well as any information requested by the relevant judicial authority.

Also, among the users, there is this same need to have the capability of requesting information to the telecommunications operators in order to know and to certify the transaction data themselves, for example, the data transmitted, the date, the receiving data or any other useful information for the user. This need can be motivated by the request from a third party to the user of the previously mentioned transactional data.

As a special case, in which proof of the delivery to the recipient is needed, there is the delivery of the invoices issued by a generating user to be able to show that, subsequently to the reception of the provision of services or products, a receiving user gets the invoice for those services, thus avoiding that the receiving users of a product or service claim non-receipt of the corresponding invoice to avoid or delay payment of the same.

Known methods in the state of the art of reliable notification, such as the telegram, office fax or registered letter have several disadvantages, such as non mechanization of the process, which results in a high consumption of time and also a high cost.

The invention object of this application provides a solution to the above mentioned disadvantages through a simple method of certification which includes the transmission data, the transmitted data and data of the final status of the transmission.

DESCRIPTION OF THE INVENTION

As discussed above, the object of the invention is a method so that a telecommunications operator can certify the delivery of a data message to a mobile terminal on the basis of the verification of both the transmission and the data it contains. More specifically the method object of the invention could be applied to the delivery of a short message with the text of an invoice, or alternatively, to a multimedia message with an attached invoice, although any other data or text sent it is also the object of this invention.

The method for the certification of data messages transmission to mobile terminals object of the invention is characterized in that it comprises the following steps which are performed in a certification system of data messages transmission which comprises at least the following elements:

A user interface in connection with a processing unit for the creation of data messages, so that the user creates the data message through the interface.

A server for sending and receiving data messages.

An e-mail server.

A data processing unit for the execution of the certification, i.e. for the creation of the certificate with the data to be included in the certification that is finally issued to the user.

All the previous units are interconnected, so that the method object of the invention comprises the execution of the following steps:

Creation of a data message in the processing unit through the user interface.

Delivery of the data message created via the data messages transmission server to the mobile terminal.

Reception, at the data messages receiving server, of a delivery notification of the data message sent to the mobile terminal, this delivery notification can be either that the message has been delivered or the message has not been delivered.

Creation in the data processing unit of an electronic document that comprises at least user data, date of issuance, content and delivery notification data of the message sent.

Implementation in the data processing unit of a digital signature algorithm to the electronic document for the creation of a certificate.

Delivery of the certificate to the user through the mail server.

According to the foregoing, the method can be used whenever there are e-mail communications and data messaging, both SMS or MMS, therefore, it has a reduced cost, its automatic and fast.

It is based on the legal status of the information transmitter operator, his status as a trusted third party before the authorities for having a telecommunications license and in the obligatory registration of his activity, as he is a usual supplier of such information to third parties.

DESCRIPTION OF THE DRAWINGS

To complement the description being made and in order to help better understand the features of the invention, according to a preferred embodiment thereof, a FIGURE is attached as an integral part of said description, wherein the following is shown as way of illustration but not limited to:

FIG. 1.—Shows a flow diagram of an embodiment of the method object of the invention.

PREFERRED EMBODIMENT OF THE INVENTION

FIG. 1 represents an embodiment of the method for the certification of data messages transmission to mobile terminals. Specifically, the case in which the user, which is a client of the certification authority, sends a text message or SMS which reception and content he wants to certify, is represented in the embodiment, in particular, the text message contains the text of an invoice, whose reception on the part of the receiver is to be certified.

To do this, the user accesses the certification system with his user name and password, either through the web, by specific application to a user interface (1) in which he can create the text message. Once there, he writes the text, for example with all the necessary details of the invoice, or, if it was an MMS, he attaches a file with the invoice.

Once this is done, the processing unit for the creation of data messages (2) sends it to the data messages transmission server (3).

In addition, the method may include the step of storing a copy of the data message in a database (6) and even the database can perform a decomposition of the data message in the different objects that make it up: origin, destination or destinations, text included, attachments, sent date, and later the delivery date and finally the numbering of all the objects with their allocation to the user.

Subsequently, it is sent, by means of the interconnections with the rest of the operators, to the destination operator. This destination operator receives the message in its data messages receiver server (11). From there, it goes to its system which detects the status format of the mobile terminal (10) of the destination user. If the mobile terminal (10) of the destination user is active in the network, the SMS with the data of the invoice is delivered. When the mobile terminal (10) receives the SMS, it emits an acknowledgment of receipt that will be transmitted to the data messages receiver server (11) of the operators destination network. Once the above mentioned server (11) receives it, its retransmitted through the interconnections and is received by the data messages receiver server (3) of the system of the invention.

Once it is received, its passed to the processing unit (5), that composes the file of the certificate. The processing unit (5) creates, in the embodiment shown in the FIGURE, an electronic document, for example, in pdf format, which includes the users data (1), the date of issuance, the content, file attachments if any, and finally the time and date of the data message delivery.

Once this electronic document is created, it is digitally signed by a digital signature algorithm for the creation of a certificate.

Additionally, a digital sum of all the previous content can be performed, i.e. of the electronic document and the digital firm and it is sent to a timestamping (20), in order to obtain an electronic document with two electronic signatures of two companies to give greater legal reinforcement to the certificate itself.

This certificate is passed to the outgoing mail server (4) that attaches it to an email message and sends it to the issuer of the SMS, and he finally gets an e-mail with a pdf which is the certificate proving he sent the invoice by SMS and was received by the destination mobile terminal (10).

If it cannot be delivered, the message server (3) of the certification system of the certification company receives the data of the transactions performed, which are sent to the processing unit (5).

Once the indications of delivery, the steps, the incidents and any information that can be useful to the certification process are received, the processing unit (5) also creates an electronic document, for example, in pdf format which includes the data of the issuer, the date of issuance, the content, the attached files if any, and finally the time and date of the data message delivery attempt.

Once this electronic document is created, it is digitally signed by a digital signature algorithm, creating the certificate, as mentioned above.

Once the final file or certificate is obtained, its sent to the issuer and is delivered to the outgoing mail server (4). This server (4) sends an email to the user including the certificate, in this case with the failed attempt of delivery.

The invention claimed is:

1. A method for the certification of data messages transmission to mobile terminals wherein the certification is carried out by a telecommunications operator as certification authority, the method comprising the following steps:

creation of a data message in a processing unit for the creation of data messages of the certification system, delivery of the data message created, via a data messages transmission server, to the mobile terminal through a data messages receiver server of a network of a destination operator of the mobile terminal, detecting a status of the mobile terminal of the destination user, so that when the mobile terminal of the destination user is active in the network, a SMS with the data of the invoice is delivered emitting an acknowledgement of receipt, transmitting the acknowledgement of receipt to the data messages receiver server of the operator's destination network, retransmitting the acknowledgement of receipt to the data messages receiver server once the data messages receiver server of the operator's destination network receives the acknowledgement of receipt, and creation in a data processing unit of the certification system, operative for the execution of the certification, of an electronic document that comprises at least user data, date of issuance, content and delivery notification data of the data message sent, being the method characterized by comprising the following steps:

implementation in the data processing unit of a first digital signature algorithm to the electronic document for the creation of a certificate, sending the certificate to a third party for the execution of a second digital signature, transmitting the certificate to the outgoing mail server that attaches it to an email message and send it to the issuer of the SMS, applying a timestamp by means of a timestamping via the data processing unit, and delivering the certificate to the user through a mail server.

2. The method for the certification of data messages transmission to mobile terminals of claim 1, further comprising storing the data message in a database.

3. The method for the certification of data messages transmission to mobile terminals of claim 1, further comprising a decomposition of the data message is carried out in at least: origin, destination, text, and delivery date.

4. The method for the certification of data messages transmission to mobile terminals of claim 1, wherein the data message comprises an attached file.

* * * * *